July 1, 1930.  R. MacGREGOR  1,768,701
HATCH COVER
Filed Nov. 3, 1928   2 Sheets-Sheet 1

INVENTOR:
Robert MacGregor
BY Reege, Boyn &Bakelen
ATTORNEYS.

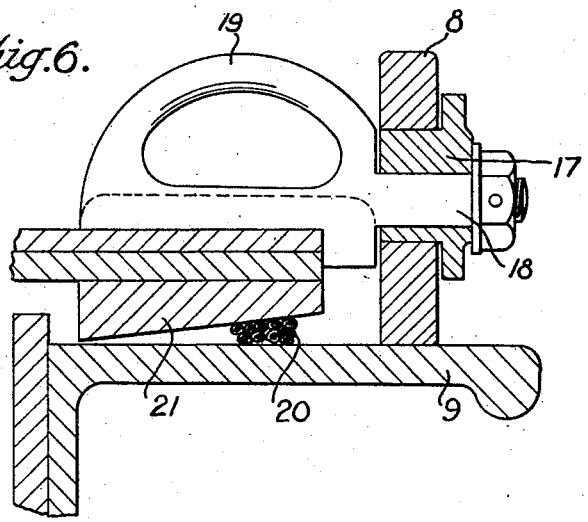
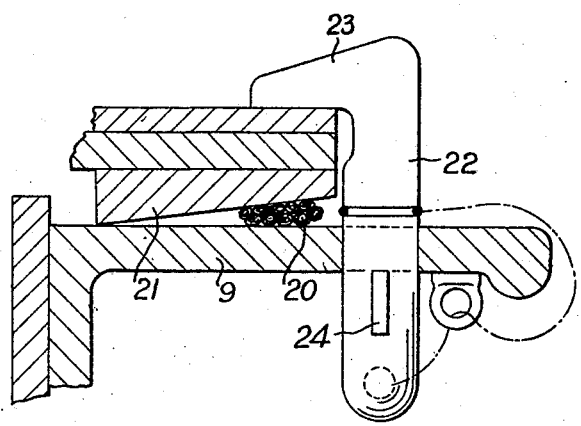

Patented July 1, 1930

1,768,701

UNITED STATES PATENT OFFICE

ROBERT MacGREGOR, OF LONDON, ENGLAND

HATCH COVER

Application filed November 3, 1928, Serial No. 316,893, and in Great Britain August 22, 1928.

This invention relates to ship's hatch covers, and has for its primary object to provide for smooth running of a hatch cover from its normal covering position over the hatch to a position in which it becomes horizontally disposed at the side of the hatch, clear of the hatch opening.

Another object of the invention is to provide portable means adapted to extend across the hatch opening to serve as a track for rollers provided on cover plates, in the case where two or more cover plates are employed arranged side-by-side to move parallel to one another to and from their covering positions.

A further object is to provide for a hatch cover plate, when moved clear of the hatchway, serving as a portable working platform.

A still further object of the invention is to provide for plates or sections of a composite hatch cover being stacked one upon another at the side of the hatch when not in use for covering purposes.

Figure 1:
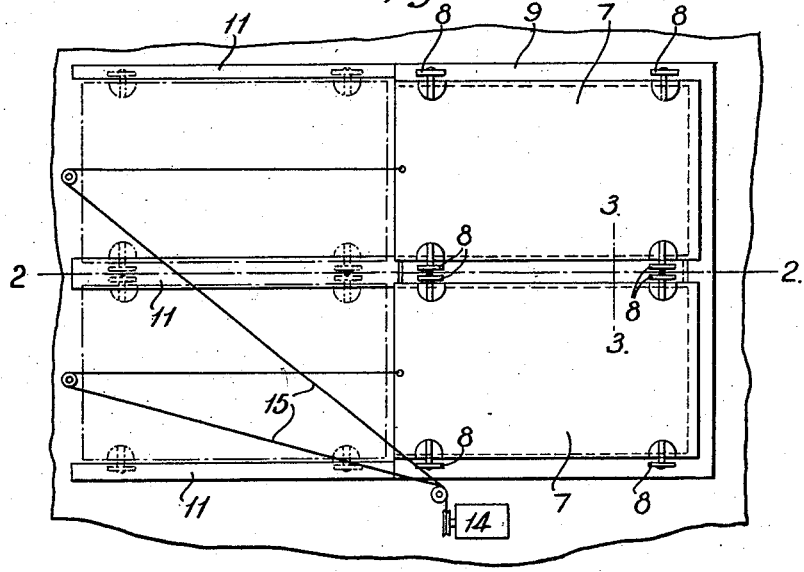
Figure 2:
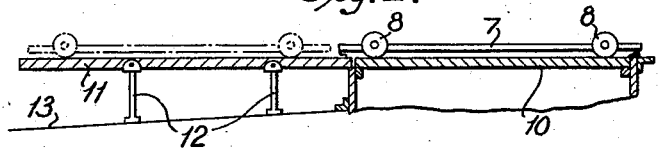
Figure 3:
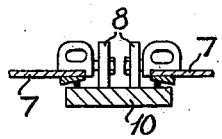
Figure 5:
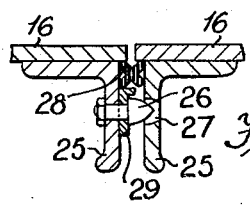
Figure 4:
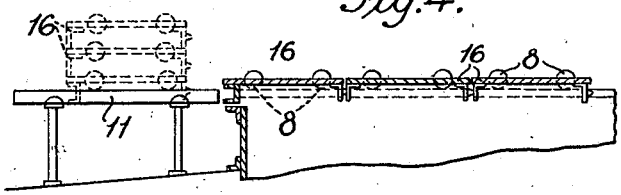

Of the accompanying drawings forming part of this specification,

Figure 1 is a plan view of a hatch cover in accordance therewith composed of a pair of cover plates arranged side by side, Figure 2 is a longitudinal section thereof on line 2—2, Figure 3 is a cross-section on line 3—3, Figure 4 is a longitudinal section of a modification having a composite cover plate, and Figure 5 is an enlarged section showing the meeting ends of the sections of the composite cover plate shown in Figure 4.

Figure 6 is an enlarged section through one of the rollers employed in each of these constructions whilst Figure 7 is a sectional view of a holding-down pin a number of which may be employed to hold down the cover plates.

In the construction shown in Figures 1, 2 and 3, a pair of cover plates 7, 7 are provided arranged side-by-side which together cover the single hatch opening. Each of the cover plates is furnished with rollers 8 some of which are adapted to run on external flanges 9 of the hatch coaming, the other, inner set of rollers running on a beam 10 which is portable and placed into position when required to extend across the hatch opening so as to provide a support for the cover plates. The cover plates 7, 7 are adapted to be moved in a horizontal plane towards one side of the hatch opening until they assume the positions shown in dotted lines in Figures 1 and 2 clear of the hatch opening and when moved to such positions the rollers 8 of the cover plates roll on to portable horizontal track rails 11 which are supported by struts 12 from the deck 13.

One or each of the plates 7 when moved on to the track rails 11 will serve as a working platform.

If desired more than two plates 7 may be provided to cover the hatch opening, in which case the number of portable beams 10 will be increased, depending upon the number of plates employed. Or one plate only may be employed, in which case the use of a portable beam extending across the hatch opening is not necessary, all the rollers thereof running on the flanges of the hatch coaming.

A winch and pull ropes arranged for instance as shown by references 14 and 15 may be provided for moving the cover plates 7 mechanically.

Although in Figures 1 and 2 the cover plates are shown as being movable towards one side only of the hatch, if desired a similar arrangement of rails 11 and winch and ropes 14 and 15 may be provided on the opposite side of the hatchway to enable the cover plates to be moved off either towards one side or the other side.

In the construction shown in Figure 4 a cover composed of plurality of plates or sections 16 is provided. In this case the plates 16 are adapted to be stacked one upon the other in horizontal dispositions when clear of the hatchway as shown by dotted lines, at one or both sides of said hatchway, being supported on the rails 11 onto which run the rollers 8 of the lowermost plate. One composite plate only, composed of the sections 16, may be provided, or two or more of such composite plates may be provided arranged side-by-side in the manner of the single plates hereinbefore described with reference to Figure 1. In the latter case a portable beam or beams 10 as hereinbefore described will be employed.

In connection with each of the constructions above described, each of the rollers 8 is mounted to rotate about a bush 17 eccentrically bored to take an axle 18 which is formed integrally with an eye-plate 19 attached rigidly upon the cover plate, as shown in Figure 6. The projecting portion of the eccentric bush 17 is formed as a manipulating lever by operating which the bush 17 is partially rotated and the cover plate raised or lowered with respect to the axis of the roller 8 thus, after bringing the cover plate to the required covering position it may be lowered by partially rotating the bush 17 in order to cause it to take a firm bearing.

In order to form a watertight joint around the contour of the hatch cover, suitable packing such as a rope 20 can be interposed between the cover plates and the hatch coaming flanges 9 and beam 10 after bringing the plates to required positions and before lowering same, and a tapered or wedge section bar 21 affixed to the underneath of the overlapping part of each cover plate comes to bear on such packing when the cover plate is lowered as above described.

In order to ensure of a firm seating of the cover plate a number of pins 22 (Figure 7) may be swivelly mounted in the coaming flanges 9 in suitable positions, having lateral heads 23 adapted to bear on the upper surfaces of the various cover plates, and being slotted in order to receive tapering cotters 24 adapted to bear against the undersurfaces of the coaming flanges, by means of which the plates are firmly pressed down into place. The said pins 22 are adapted to be turned about the axes of their stem portions from the cover-plate-engaging positions shown, to an alternative position in which their lateral heads 23 are clear of the plates, so as to allow the latter to be raised and moved as required.

In the case of the construction shown in Figures 4 and 5, in order to ensure of correct positioning and engagement of the adjacent cover plates 16 with one another when in covering positions, downwardly-extending walls 25 on the cover plates disposed adjacent and parallel to the abutting edges, have a stud and hole engagement with one another. That is to say at each joint between adjacent plates, the adjacent wall 25 of one plate is furnished with two or more projecting studs 26, which may have pointed or rounded noses, each of said studs taking into an aperture 27 in the adjacent wall 25 of the next plate, as shown in Figure 5.

The disposition of said walls 25 is such that when adjacent plates abut, a space exists between their respective adjacent walls 25. Within the said space is inserted a rubber jointing strip 28 of cross or cruciform section to form a watertight joint, said strip being mounted upon an angle-section bar 29.

I claim:

1. A hatch cover comprising a plurality of composite sliding covers arranged side-by-side to cover a single hatch opening and adapted to slide off the hatch parallel to one another, a portable beam extending across the hatch opening, each of said composite covers comprising a plurality of sections each having rollers adapted to travel on external flanges of the hatch coaming and on the portable beam and arranged to support each section in a horizontal plane, and portable track rails arranged outside of the hatch area as level continuations of the said coaming flanges and of the portable beam, on which the cover sections are adapted to be stacked horizontally one upon the other when moved clear of the hatch.

2. A hatch cover comprising a plurality of composite sliding covers arranged side-by-side to cover a single hatch opening and adapted to slide off the hatch parallel to one another, a portable beam extending across the hatch opening, each of said composite covers comprising a plurality of sections each having rollers adapted to travel on external flanges of the hatch coaming and on the portable beam and arranged to support each section in a horizontal plane, portable track rails arranged outside of the hatch area as level continuations of the said coaming flanges and of the portable beam, on which the cover sections are adapted to be stacked horizontally one upon the other when moved clear of the hatch, positioning studs projecting from each of the cover sections to engage apertures in adjacent sections, a rubber jointing strip disposed below each of the divisions between adjacent sections, and laterally-headed pins swivelly mounted in the coaming flanges for holding down the cover sections.

3. A hatch cover comprising a plurality of composite sliding covers arranged side-by-side to cover a single hatch opening and adapted to slide off the hatch parallel to one another, a portable beam extending across the hatch opening, each of said composite covers comprising a plurality of sections each having eye plates formed with axle portions, eccentric bushes adapted to be turned on said axle portions and rollers rotatable about said bushes and adapted to travel on external flanges of the hatch coaming and on the portable beam and arranged to support each section in a horizontal plane, and portable track rails arranged outside of the hatch area as level continuations of the said coaming flanges and of the portable beam, on which the cover sections are adapted to be stacked horizontally one upon the other when moved clear of the hatch.

In testimony whereof, I have signed my name to this specification at London, England this 30th day of August, 1928.

ROBERT MacGREGOR.